Aug. 26, 1969   A. R. COX   3,462,776
CORED PILLOW AND METHOD OF MAKING SAME
Filed July 6, 1967   2 Sheets-Sheet 1

FIG I

INVENTOR.
ALVON R. COX
BY
ATTYS.

Aug. 26, 1969     A. R. COX     3,462,776

CORED PILLOW AND METHOD OF MAKING SAME

Filed July 6, 1967     2 Sheets-Sheet 2

INVENTOR.
ALVON R. COX
BY *Oldham & Oldham*
ATTYS.

United States Patent Office 3,462,776
Patented Aug. 26, 1969

3,462,776
CORED PILLOW AND METHOD OF MAKING SAME
Alvon R. Cox, Ashland, Ohio, assignor to Abbott Laboratories, Chicago, Ill., a corporation of Illinois
Filed July 6, 1967, Ser. No. 651,443
Int. Cl. A47g 9/00
U.S. Cl. 5—337                             9 Claims

ABSTRACT OF THE DISCLOSURE

A deformable object with top and bottom portions having holes extending thereinto is provided and it has a slot extending therethrough through which the object can be turned inside out. A method of making the object and turning it inside out to provide the ultimate article is disclosed.

---

This invention relates to a novel cored pillow and method of making same, and more particularly to a foam rubber pillow which is one piece molded in an inside-out condition, and after molding is turned outside-out to complete the one piece construction.

Heretofore it has been known that pillows are made from foam and provided with a plurality of holes or cores so as to be more readily deformable. Some cored pillows made from foam rubber or other suitable material have been molded in cored pillow section halves with the two halves being aligned and adhesively secured together to form the complete pillow. Other cored pillow constructions utilize a pin core design to provide a plurality of holes or bores on the outer surface, but this is open to the objection that the presence of these holes on the outer surface of the pillow is unsightly and uncomfortable to the user as the holes form an irregular outer surface on the pillow. Generally, these pillows of pin core construction are limited to small sized holes which do not cause a great distortion to the outer surface when the pillow is provided with a cloth cover. However, smaller pin cores limit the deformability of the pillow.

Therefore, it is the general object of the present invention to avoid and overcome the foregoing and other difficulties of and objections to prior art practices by the provisions of a one piece foam pillow construction which can be molded with a pin core design in a single cavity mold which molded construction is initially made inside-out and of a special design so that after molding it can be turned outside-out to provide a smooth and continuous outer surface on a cored one piece cushion.

Another object of the invention is to provide a method for forming a pillow in a single cavity mold which utilizes a pin core design, but which molded pillow can be turned outside-out after molding to provide a pillow having a smooth and continuous outer surface with the advantages of the core design.

A further object of the invention is to provide a one piece cored foam pillow construction which can be molded in a single cavity injection mold, and which can be fabricated more easily and at less expense than a two piece molded core pillow.

The aforesaid objects of the invention and other objects which will become apparent as the description proceeds are achieved by providing a pillow comprising a resilient body having an outer cored surface of a curved pillow-like symmetric shape on each half, a laterally wide vertically short slot extending through the body and lying substantially on the plane splitting the symmetric halves of the body, and a plurality of inwardly directed independent opposed bores extending into and uniformly spaced on the symmetric halves of the body so that, when the body is pulled inside-out at the slot, the bores come into substantial interconnected alignment inside the body and the slot presents a continuous and smooth outer surface on the body.

The method of the invention provides for forming a pillow which comprises the steps of molding from a foam rubber or similar material a one piece resilient body having an outer surface of a curved pillow shape with symmetric halves, providing a laterally wide vertically short slot through the body substantially on a plane defining the symmetric halves thereof, providing opposed independent bores uniformly spaced on the symmetric halves of the body extending from the outer surface thereof inwardly, and turning the body inside-out at the slot so that the opposed bores are aligned and interconnected inside the body with the slot presenting a continuous and smooth outer surface to the body.

For a better understanding of the invention, reference should be had to the accompanying drawings, wherein.

While it should be understood that the outside-in to outside-out molding technique described hereinafter, may be adaptable to molding any type of foam structure utilizing a cavity and/or pin core design, or where it is desired to have a continuous and smooth outer surface with an inner cavity to modify resiliency, the invention has been made with reference to a cored pillow design, and hence it has been so illustrated and will be so described.

Figure 1:
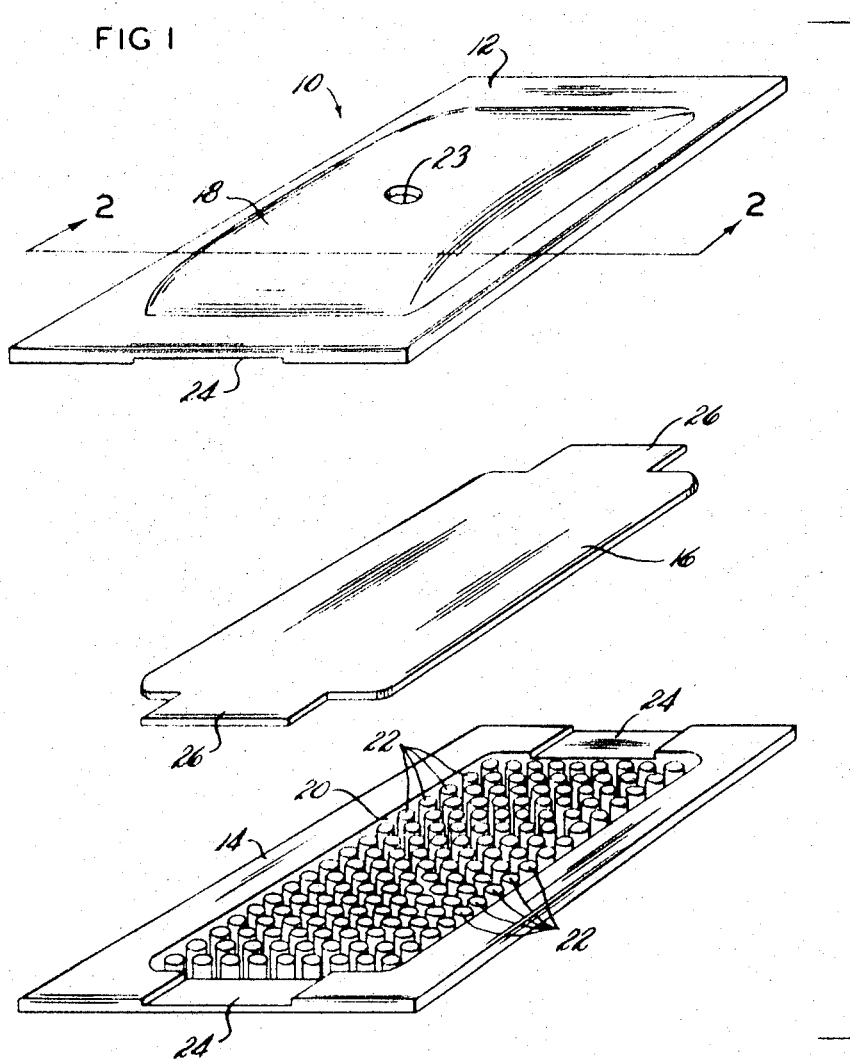
FIGURE 1 is an exploded perspective view of the mold utilized to form the pillow.

With reference to FIGURE 1 of the drawings, the numeral 10 indicates generally a mold comprising a top plate 12 and a bottom plate 14 with a core or separator plate 16 adapted to be positioned therebetween. A mold cavity is defined by separate symmetrical half cavities 18 and 20 in plates 12 and 14, respectively. Each cavity 18 and 20 is filled with a plurality of aligned and preferably equally spaced vertically directed pins, indicated generally by the numeral 22, extending into the cavity. The ends of the pins 22 in each mold normally terminate in a plane in each mold, which planes will be spaced slightly from each face of the core plate 16 when it is properly in position. Thus, there will not be any interconnection between the slot defined by the core plate 16 and the cores defined by the pins 22 when the pillow is molded. An injection molding hole 23 is provided on the top plate 12, which communicates with the half-cavity 18.

Figure 2:
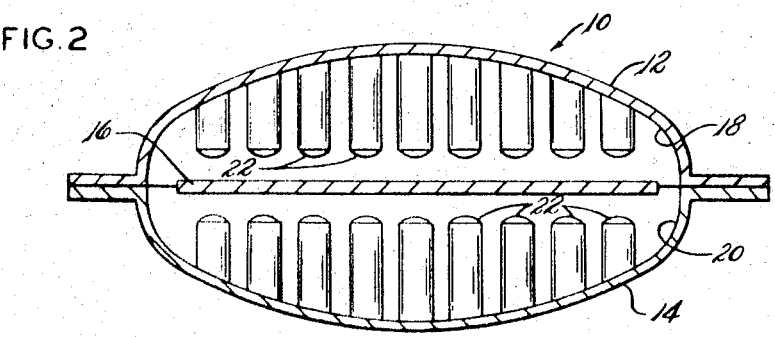
FIGURE 2 is a vertical cross sectional view of the mold of FIGURE 1 in the normally closed relation, taken on the line 2—2 of FIGURE 1.

In order to achieve the objects of the invention, the plate 16 is generally made of a width slightly less than the width of the half cavities 18 and 20, as more clearly seen in FIGURE 2. In order to provide a sealed relation between the top plate 12 and the bottom plate 14 over the core or separator plate 16, the plates are provided with notched sections 24 adapted to receive extending ears 26 of the plate 16. Thus, a sealed relationship can be made to provide a single cavity mold of the desired pillow shape. The seal may preferably be metal to metal, although a suitable gasket seal could be utilized.

The plate 16 and molds or plates 12 and 14 may be made from any suitable materials and may be coated with any desired substances on their cavity defining surfaces to facilitate separation from the molded articles produced.

With reference to FIGURE 2, the relationship of the pins 22 with respect to the half mold cavities 18 and 20 and the separator, or plate 16 is more clearly shown. It should be noted that the spaced relationship between the inner ends of the pins 22 and the plate 16 is spaced so that when the surface defined by the plate 16 becomes the outer surface of the pillow, as described hereinafter, there will be a sufficient thickness between the ends of the holes or cores defined by the pins 22 so that no irregular surfaces will be resultant on the outer surfaces because of the cores provided by the pins 22. Also, FIGURE 2 clearly shows the metal to metal sealed relationship between the top mold plate 12 and the bottom mold plate 14 when the separator or core plate 16 is in position. It should be further noted that there is a substantial space between the lateral edges of the plate 16 and the inside defining surface of the half cavities 18 and 20.

Figure 3:
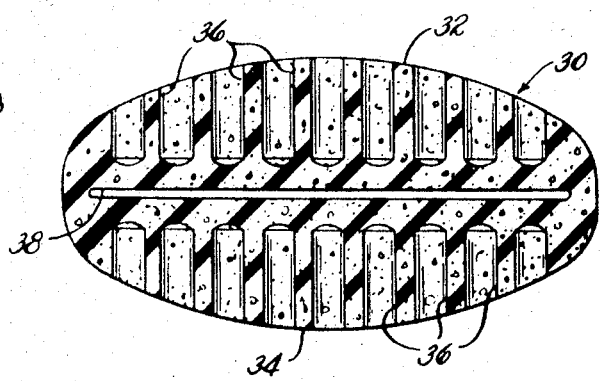
FIGURE 3 is a vertical cross sectional view of a foam pillow formed in the mold of FIGURE 1 as assembled in FIGURE 2.

FIGURE 3 illustrates a cross sectional view of a foam rubber pillow formed by the injection mold 10 of FIGURE 1, and as shown in cross section in FIGURE 2. This pillow, indicated generally by the numeral 30, comprises a body portion which generally takes the form of a pillow shape having symmetrical halves 32 and 34. Each half 32 and 34 contains a plurality of inwardly directed independent opposed cores, indicated generally by the numeral 36, which are formed by the pins 22 of the cavities 18 and 20 of FIGURE 2. A laterally wide and vertically short slot 38 formed by the plate 16 extends the length of the body 30 and substantially lies on the plane dividing the halves 32 and 34.

Figure 4:
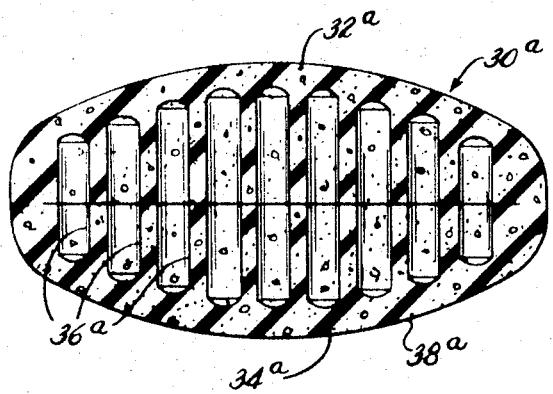
FIGURE 4 is the pillow of FIGURE 3 which has been turned outside-out over the narrow centrally molded slot as seen in FIGURE 3.

In order to accomplish the desired objects of the invention, the body 30 of FIGURE 3 is then pulled inside-out at the slot 38 which inverts the pillow to a form, substantially as illustrated by the body 30a in FIGURE 4. In this instance, the slot 38 of FIGURE 3 forms the smooth and continuous outer surface 38a of FIGURE 4. The plurality of bores or holes 36 of FIGURE 3 becomes oppositely directed, aligned and interconnecting bores 36a of FIGURE 4. But, because of the shape defined by the halves 32 and 34 of FIGURE 3, the symmetrical halves 32a and 34a of FIGURE 4, are substantially the same. If desired, before the inversion, the outer exposed surfaces of the halves 32 and 34 of FIGURE 3 can be coated with an adhesive so that upon the inside-out movement and the meeting of these surfaces, as seen in FIGURE 4, they may be then adhesively secured together, but such adhesive is usually not required. The inversion of the pillow of FIGURE 3 and the pillow of FIGURE 4 also places any irregular surface caused by the injection molding through the hole 24 of FIGURE 1 and be inside the pillow so as not to disturb the smooth outer surface.

It should be understood that the inversion of the molded pillow of FIGURE 3 to the finished pillow of FIGURE 4 actually stretches the material defining the surface of the slot 38. Therefore, this material which now is the outer surface of the pillow is under tension and effects an annular or completely surrounding compressing force on the body 30a to provide the desired finished shape which will be substantially the same as the molded shape.

Although the invention has been described as having the holes or cores uniformly spaced and substantially aligned, it should be understood that the objects of the invention can be achieved with nonuniform spacing and nonalignment. The primary object of the invention is to provide a smooth and continuous outer surface with some type of holes or cores on the inside to provide the desired resilience.

Any convenient means to effect the inside-out movement of the molded pillow of FIGURE 3 to the completed pillow of FIGURE 4 can be utilised. At the present time a manual movement is contemplated. Also, it may be necessary to provide some further manual manipulation to be sure that the bores, or holes, or cores 36a of FIGURE 4 are properly aligned, as indicated, or at least substantially aligned.

It will be seen that the resilient pillow of the invention can be made from any suitable moldable material by known molding processes to provide a one piece pillow that can be turned inside-out at the slot extending the length thereof.

Thus it is seen that the objects of the invention have been achieved by providing a one piece molded pillow having a pin core design on the outer surface thereof, but which has been formed with the desired outside surface on the inside in the form of a laterally wide vertically short slot. The pillow is then turned from outside-in to outside-out over this slot to form the continuous and smooth outer surface with the pin core cavities resultant on the inside which gives the desired resiliency. As is clearly evident from the drawings, this adapation can utilize pin cores of any convenient sizze to accomplish the desired resiliency of the finished product. It is also evident from the description herein that the method of forming the finished pillow includes the steps of injection molding the pillow in an outside-in inverted relationship in a single cavity injection mold, which molding provides a laterally wide vertically short slot extending the length of the pillow and a plurality of pin core cavities in opposed relationship on both surfaces thereof, so that inversion of the pillow to an outside-out relation about the narrow slot provides the desired finished product.

While in accordance with the patent statutes only one best known embodiment of the invention has been illustrated and described in detail, it is to be particularly understood that the invention is not limited thereto or thereby.

What is claimed is:
1. A deformable object which comprises
a body molded from a resiliently deformable material which comprises
a top and bottom portion defined by an imaginary plane substantially bisecting the body,
a plurality of independent inwardly extending holes located on the top and bottom portions, and
a slot extending through the body and substantially coinciding with said imaginary plane so that the body may be pulled inside-out at the slot thereby providing a smooth and continuous outer surface to the body.

2. An object as in claim 1 where
said resilient body is of a substantially elliptical pillow shape in cross section, said body being formed in one piece in a mold so as to have a plurality of core holes uniformly spaced and covering the top and bottom surfaces thereof and extending variable depths thereinto but less than half the thickness of the body.

3. An object as in claim 1 where the cores are uniformly spaced on the symmetric halves of the body, so that when the body is pulled inside-out at the slot, the holes come into substantially interconnected alignment and the previous slot walls present a continuous and smooth outer surface to the body.

4. An object as in claim 1 where adhesive means are provided to secure the pillow portions together with the holes in aligned interconnected relationship.

5. A unitary molded cushion, pillow, or like article comprising a
resilient body having a continuous outer surface and having a plurality of core holes on the inner surface thereof,
said body having a separation plane therein extending the entire length thereof and substantially the width thereof.

6. An article as in claim 5 wherein said continuous outer surface is under tension and slightly compresses the center of the article.

7. A method for forming a resilient body which comprises
molding the body from a resilient material in a single cavity mold having two half cavities defined by an imaginary plane, the body having a plurality of inwardly directed holes in the outer surface thereof and a slot extending the length of the body substantially through the center thereof, said holes extending into but not through the body and being separated from said slot, and turning the molded body inside-out at the slot so that the slot surface forms the outer surface of the body and the holes are on the inside of the body.

8. A method for forming a resilient body as in claim 7 which comprises molding the body from foam rubber as a one piece body having an outer surface of a curved pillow shape and symmetric on both halves.

9. A method for forming a resilient body as in claim 7, including the step of adhesively securing the core holes in interconnected alignment after the body is turned inside-out.

References Cited

UNITED STATES PATENTS

| | | | |
|---|---|---|---|
| 2,315,391 | 3/1943 | Blair | 5—337 |
| 2,405,345 | 8/1946 | Cooper et al. | 264—50 |
| 3,064,279 | 11/1962 | Finkle | 5—337 |
| 2,845,659 | 8/1958 | Calvert | 264—50 |

BOBBY R. GAY, Primary Examiner

ANDREW M. CALVERT, Assistant Examiner

U.S. Cl. X.R.

5—361; 18—39; 264—50; 297—452